United States Patent [19]
Menard et al.

[11] Patent Number: 4,733,635
[45] Date of Patent: Mar. 29, 1988

[54] HEAT GENERATOR FOR AUTOMOBILE VEHICLES

[75] Inventors: Denis Menard, Courbevoie; Jean Herbulot, Franconville, both of France

[73] Assignee: 501 Valeo, Paris, France

[21] Appl. No.: 890,643

[22] Filed: Jul. 30, 1986

[30] Foreign Application Priority Data

Jul. 30, 1985 [FR] France .................. 85 11598

[51] Int. Cl.⁴ .......................... F22B 3/06; F24C 9/00
[52] U.S. Cl. ............................... 122/26; 126/247; 237/12.3 R; 237/12.3 B; 237/5
[58] Field of Search ............... 126/247; 122/26; 237/12.3 B, 12.4, 1 R, 12.3 R, 5

[56] References Cited

U.S. PATENT DOCUMENTS

| | | | |
|---|---|---|---|
| 3,164,147 | 1/1965 | Love et al. | 126/247 |
| 3,402,702 | 9/1968 | Love | 126/247 X |
| 4,285,329 | 8/1981 | Moline | 126/247 |
| 4,295,461 | 10/1981 | Cummings et al. | 126/247 |
| 4,325,354 | 4/1982 | Fuchs | 126/247 |
| 4,387,701 | 6/1983 | Gibbons | 126/247 |

Primary Examiner—Randall L. Green
Attorney, Agent, or Firm—Charles E. Brown; Charles A. Brown

[57] ABSTRACT

A heat generator suitable for heating the cab or passenger compartment of a motorized automobile vehicle comprises an enclosure inside which are mechanical friction means adapted to be driven by the motor of the vehicle. These friction means are operable with a variable clamping force. A heat transfer liquid is circulated through this enclosure. The clamping force of the friction means is varied in inverse proportion to the speed at which friction means are driven by the motor. Thus the clamping force on the friction means is reduced as the motor speed increases, so that the quantity of heat produced is largely independent of the rotation speed of the motor.

6 Claims, 1 Drawing Figure

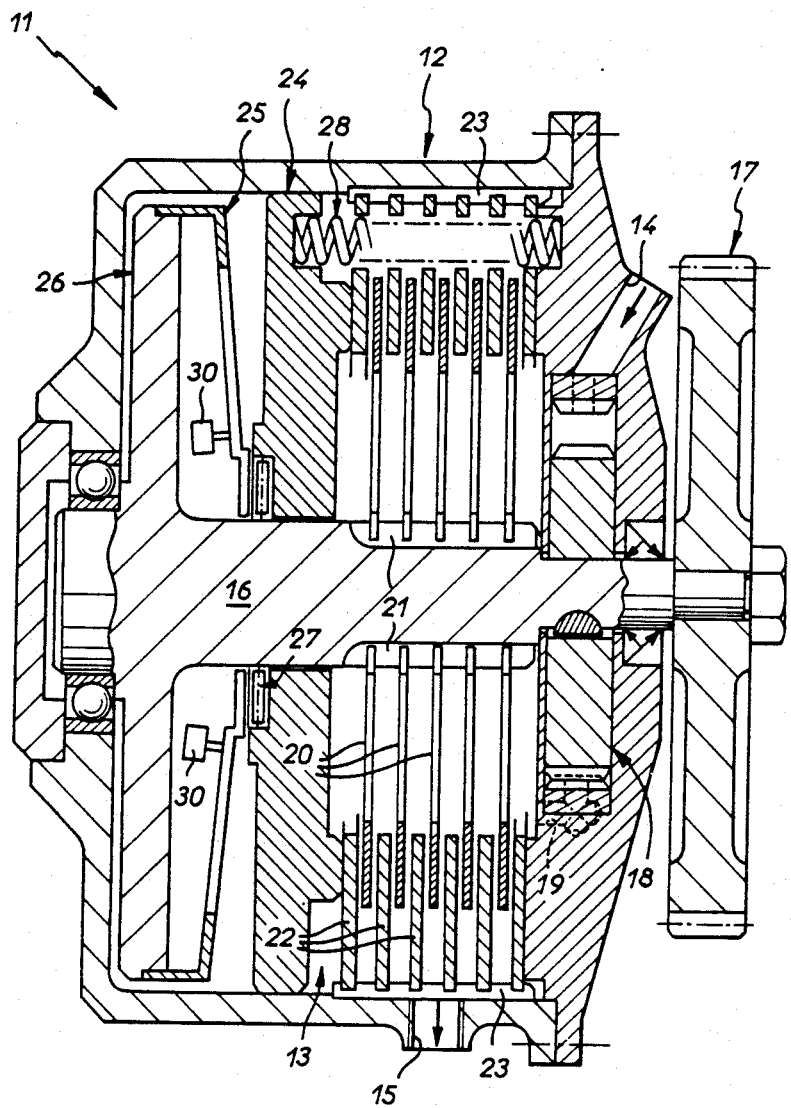

HEAT GENERATOR FOR AUTOMOBILE VEHICLES

BACKGROUND OF THE INVENTION

1. Field of the invention

The invention concerns a heat generator for automobile vehicles, more specifically adapted to supplying additional heat to the cab or passenger compartment of the vehicle and/or for obtaining or maintaining a sufficiently high motor operating temperature, even at idling speed.

2. Description of the prior art

There are known "top up" heating installations for automobile vehicles in which the heat is generated by maintaining circulation of fluid and creating heat losses in the circulation of this fluid. Thus numerous systems proposed comprise a restriction and a pump forcing a liquid through this restriction. Other known systems use vane members of which one is prevented from rotating and between which a liquid is circulated, becoming heated as a result of friction developed between the vane members. The invention relates to another concept for the production of heat utilizing friction members immersed in a heat transfer fluid. The invention is more particularly directed to regulating the heat energy produced, so as to make this largely independent of the rotation speed of the motor of the automobile vehicle by which the friction members are driven.

SUMMARY OF THE INVENTION

The invention consists in a heat generator for motorized automobile vehicles comprising an enclosure, mechanical friction means in said enclosure adapted to be driven by the motor of said vehicle and operable with a variable clamping force, means for circulating a heat transfer liquid in said enclosure, and means for varying the clamping force of said friction means in inverse proportion to the speed at which the friction means are driven by said motor.

This modulation of the clamping force applied to the mechanical friction means may be achieved in various ways, either by mechanical action utilizing flyweights responsive to centrifugal force in a direction tending to reduce the clamping force on the friction means or by hydraulic action relying on the centrifugal pressure of the heat transfer fluid in said enclosure and/or the pressure therein, which increases with the rotation speed of the pump driven by the aforementioned motor. The mechanical and hydraulic actions may naturally be combined.

The invention will be better understood and further advantages of the invention will emerge more clearly from the following description of one embodiment of a heat generator in accordance with the invention given by way of example only and with reference to the appended drawings in which the single FIGURE is a schematic representation of said heat generator in longitudinal cross-section.

DESCRIPTION OF THE PREFERRED EMBODIMENT

Referring to the drawing, there is shown a heat generator 11 comprising a casing 12 in which is formed an enclosure 13 within which a heat transfer fluid (oil or water-glycol mixture) is caused to circulate between an inlet 14 and an outlet 15. A shaft 16 is rotatably mounted in the casing 12. This shaft is driven by a toothed wheel 17 coupled to the motor (not shown) of the automobile vehicle. A gear pump 18 is accommodated inside the casing 12 and driven by the shaft 16 itself. The heat transfer fluid inlet 14 communicates with the pump 18 which discharges said heat transfer fluid into the enclosure 13 through a pipe element 19. The enclosure 13 houses mechanical friction means operable with variable clamping force. To be more precise, in this case these means consist of first friction disks 20 constrained to rotate with the shaft 16 and movable along the axis of the shaft, by virtue of longitudinal splines 21 formed on the surface of said shaft, and second friction disks 22 alternating with said first disks and movable inside the enclosure 13 in this same axial direction but prevented from rotating. To this end longitudinal splines 23 are formed on the inside surface of the enclosure 13 and the disks 22 slide along these splines. A clamping plate 24 is also mounted to slide axially within the casing 12. Loading means consisting in this instance of a pre-stressed diaphragm spring 25 are used to press the clamping plate against the disks 20 and 22 so as to clamp them against each other. The diaphragm spring 25 is supported at its periphery by a disk 26 with which it is constrained to rotate. The disk 26 is fastened to the shaft 16. The diaphragm spring 25 bears on the clamping plate through the intermediary of a needle bearing 27 or the like. Springs 28 are disposed inside the enclosure 13 so as to hold the plate 24 and the diaphragm spring 25 in contact at all times. These springs 28 develop an axial force that is very much less than that developed by the diaphragm spring 25.

In accordance with the invention means are provided to generate a force opposing that developed on the plate 24 by the diaphragm spring 25, this force being conditioned by the speed of the shaft 16 thus of the motor to which this shaft is coupled. In the example shown three different means cooperate to generate this force. The diaphragm spring 25 is fitted with flyweights 30 that are regularly distributed in the circumferential direction. In this example these flyweights are carried at the end of rods substantially perpendicular to the inclined surface of the diaphragm spring so that the centrifugal forces communicated to the flyweights according to the rotation speed of the shaft 16 are operative on the diaphragm spring in a direction tending to move it away from the plate 24. This is therefore pushed back by the springs 28 in a direction tending to reduce the clamping force on the disks 20 and 22. Moreover, according to another advantageous characteristic of the invention, the plate 24 forms a fluid-tight mobile wall of the enclosure 13. In this way the centrifugal pressure originating from the heat transfer fluid itself, entrained by the movement of the disks 20, is also exerted on the plate 24 is a direction tending to reduce the clamping force on the disks 20 and 22. In other words, as the speed of the motor driving the shaft 16 increases the centrifugal pressure communicated to the heat transfer fluid in the enclosure 13 also increases and contributes to reducing the clamping force on the friction disks and thus to regulating the quantity of heat produced. Similarly, as the throughput of the pump 18 is variable according to the rotation speed of the motor the pressure in the heat transfer fluid inside the enclosure 13 increases with speed which also contributes to pushing back the plate 24 is a direction tending to reduce the clamping force on the disks 20 and 22. All the mechanical or hydraulic means which have just been described may be used alone or in combination to achieve the required effect, namely some degree of regulation of the quantity of heat produced by the friction disks, which is largely independent of the speed of the motor of the automobile vehicle driving the shaft 16.

There may naturally be added to the device as just described an electromagnetic clutch disposed between the vehicle motor and the shaft 16 and controled by thermostatic control means (not shown) thermally interfaced directly or indirectly to the heat transfer fluid circulating in the enclosure 13 or to the element to be heated. The set point value for the thermostatic control means would be adjusted from the cab or passenger compartment of the vehicle. In the case where the motor is the internal combustion engine of the vehicle it is advantageously possible to provide between the motor and the shaft 16 a limited speed range variable speed drive such as, for example, a centrifugal variable speed drive using pulleys and a drive belt, known per se and described, for example, in French patent application No. 82.03484 published 9 Sept. 1983 under the No. 2 522 765. The inclusion of this variable speed drive would make it possible to achieve adequate heat generation even at the lowest rotation speeds of the motor.

As a possible modification the diaphragm operates directly on a rotating member such as a disk or rotor, eliminating the need for the bearing 27.

When the brake is of the oil-immersed type, an oil/water or an oil/air exchanger would be provided.

We claim:

1. Heat generator for motorized automobile vehicle comprising an enclosure, mechanical friction means in said enclosure adapted to be driven by the motor of said vehicle and operable with a variable clamping force, means for circulating a heat transfer liquid in said enclosure, and means for varying the clamping force of said friction means in inverse proportion to the speed at which said friction means are driven by said motor.

2. Heat generator according to claim 1, comprising a shaft in said enclosure, first friction disks constrained to rotate with said shaft and movable along the axis of said shaft, which is coupled to said motor, second friction disks alternating with said first disks and movable in said enclosure in the aforementioned axial direction and prevented from rotating, an axially slidable clamping plate, loading means for urging said clamping plate against said disks so as to clamp them to each other, and means for generating a force conditioned by the speed of said motor opposing the action of said loading means.

3. Heat generator according to claim 2, wherein said loading means comprise a pre-stressed diaphragm spring adapted to urge said plate against said disks and constrained to rotate with said shaft and further comprising flyweights driven in rotation by said shaft cooperating with said diaphragm spring so as to apply to it a centrifugally conditioned force adapted to reduce the force that it exerts on said plate.

4. Heat generator according to claim 2, wherein said plate forms a fluid-tight mobile wall of said enclosure in which said heat transfer fluid circulates so that it is acted on by centrifugal pressure originating from said heat transfer fluid itself.

5. Heat generator according to claim 4, further comprising a variable throughput pump mechanically coupled to said motor and feeding said heat transfer fluid, whereby an increase in the speed of said motor increases the pressure in said enclosure and operative on said plate forming a mobile wall.

6. Heat generator according to claim 5, wherein said pump is a gear pump coupled directly to said shaft.

* * * * *